United States Patent
Dunn, Jr. et al.

(10) Patent No.: US 7,697,462 B1
(45) Date of Patent: Apr. 13, 2010

(54) SYSTEM AND METHOD FOR SPLIT ISOLATION IN RADIO FREQUENCY ELECTRONICS

(75) Inventors: Gary Raymond Dunn, Jr., Taylorsville, UT (US); Richard Alan McNamee, Salt Lake City, UT (US)

(73) Assignee: L-3 Communications, Corp., New York, NY (US)

( * ) Notice: Subject to any disclaimer, the term of this patent is extended or adjusted under 35 U.S.C. 154(b) by 433 days.

(21) Appl. No.: 11/818,339

(22) Filed: Jun. 13, 2007

(51) Int. Cl.
*H04B 7/005* (2006.01)
*H04B 3/20* (2006.01)

(52) U.S. Cl. .................. 370/278; 370/288; 370/290

(58) Field of Classification Search ............ None
See application file for complete search history.

(56) References Cited

U.S. PATENT DOCUMENTS

| | | | |
|---|---|---|---|
| 6,282,176 B1 * | 8/2001 | Hemkumar | 370/276 |
| 6,674,999 B2 * | 1/2004 | Ramachandran | 455/115.1 |
| 6,738,602 B1 | 5/2004 | Heinen et al. | |
| 6,795,690 B2 * | 9/2004 | Weissman et al. | 455/78 |
| 7,130,596 B2 * | 10/2006 | Ramachandran | 455/127.1 |
| 7,162,156 B2 | 1/2007 | Frey et al. | |
| 7,512,149 B2 * | 3/2009 | Basso et al. | 370/465 |
| 7,577,248 B2 * | 8/2009 | McCree | 379/406.08 |
| 2006/0281423 A1 | 12/2006 | Caimi et al. | |

* cited by examiner

*Primary Examiner*—Chi H Pham
*Assistant Examiner*—Soon-Dong D Hyun
(74) *Attorney, Agent, or Firm*—Kirton & McConkie; William T. Ralston

(57) ABSTRACT

A system and method for designing a full duplex communications transceiver to enable a reduction in isolation between a transmit signal and a receive signal at a diplexer is disclosed. An RFE transmit filter attenuation level can be determined to be sufficient to attenuate a noise power of the transmitter below a thermal noise floor of the power amplifier. A minimum diplexer transmit filter attenuation level can be calculated to attenuate noise power output from the power amplifier in the receive band to a level below a noise floor of the receiver.

24 Claims, 3 Drawing Sheets

SYSTEM AND METHOD FOR SPLIT ISOLATION IN RADIO FREQUENCY ELECTRONICS

BACKGROUND

As technology has advanced one of the benefits has been a reduction in the size of electronic devices. One area that has benefited from this phenomenon is the field of communications. Miniaturization of various types of electronics has enabled the creation of smaller, lighter, and cheaper transceivers. Cell phones and portable radios have become smaller and capable of communicating over greater distances or using reduced power levels. Another transceiver application where this trend has been observed in recent years is the Common Data Link (CDL) program. CDL is a family of data links that provide full duplex, point-to-point digital microwave communications for the Intelligence, Surveillance, and Reconnaissance (ISR) community. CDL provides for the command, control and communications between the ISR sensor platforms and ground station processors. Smaller and lighter CDL electronics have greatly expanded the number of applications and platforms that can accommodate CDL electronics. Size, weight, and power sensitive applications such as Unmanned Aerial Vehicles and portable CDL data links are examples of more recent CDL applications.

As transmission power has increased between transceivers, the amount of isolation required between the transmitter and receiver in a typical receiver has also increased. Isolation between transmitter and receiver is typically used in a full duplex transceiver to keep the transmitter from jamming the receiver. Isolation is usually provided in the front-end electronics portion of a transceiver, typically referred to as the Radio Frequency Electronics (RFE). The RFE normally includes a power amplifier, diplexer, and Low Noise Amplifier (LNA); and may also include switches and filters, providing the front-end amplification and isolation for a data link. The RFE is the component of high power communication systems that has most resisted the trend of miniaturization. The reason the RFE has not shrunk significantly is primarily due to the largest component of the traditional RFE, the waveguide diplexer, which due to critical internal cavity dimensions, cannot shrink.

A diplexer can be used to achieve the sufficient transmit to receive isolation that enables a full duplex link, such as a CDL link, to use a single antenna. Since isolation on the order of 120 dB between the transmitter and receiver is typically needed in combination with a low insertion loss, usually no more than 3 dB, a waveguide filter diplexer is often used over other filter implementations. While providing superior isolation with low insertion loss, the relative disadvantage of the waveguide filter diplexer is that it can be significantly larger and heavier than other components within the RFE.

SUMMARY

A system and method for designing a full duplex communications transceiver to enable a reduction in isolation between a transmit signal and a receive signal at a diplexer is disclosed. An RFE transmit filter attenuation level can be determined to be sufficient to attenuate a noise power of the transmitter below a thermal noise floor of the power amplifier. A minimum diplexer transmit filter attenuation level can be calculated to attenuate noise power output from the power amplifier in the receive band to a level below a noise floor of the receiver.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

In the design analysis that follows parameters recited in the disclosed equations are typically specified by their associated components. Alternatively, the parameters can be measured using standard measuring techniques.

Figure 1:
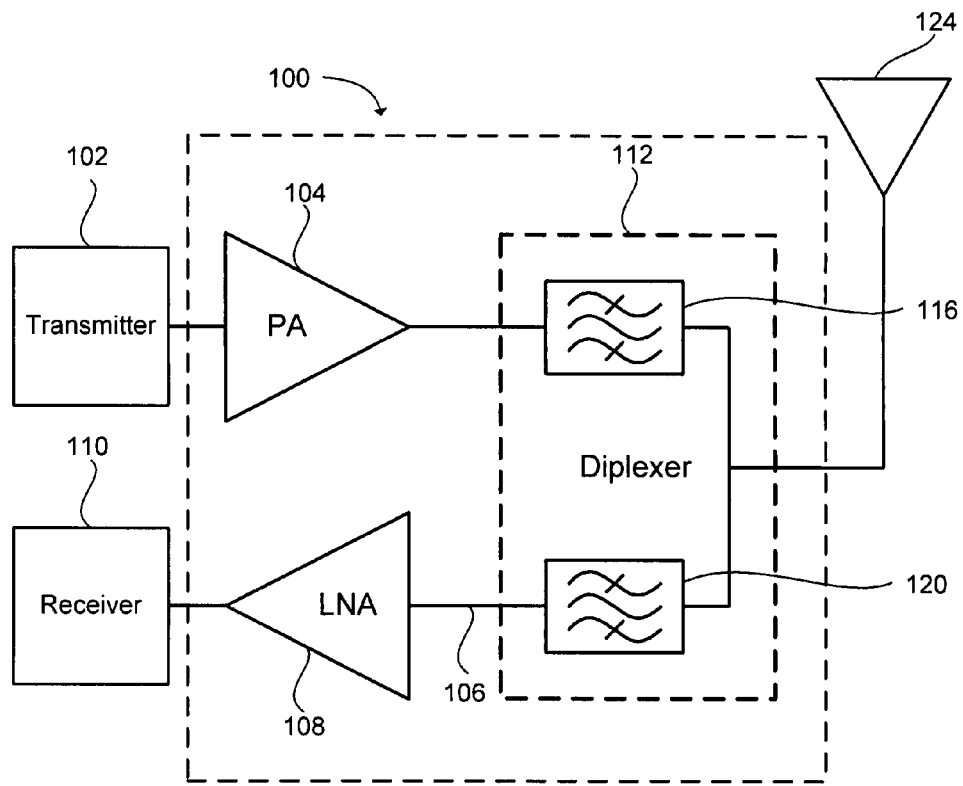
FIG. 1 is a block diagram of a typical RFE.

The block diagram of a simple, traditional or standard RFE 100 can be seen in FIG. 1. The RFE includes a transmit path wherein a transmit signal is routed through the power amplifier 104, into the diplexer 112, through the diplexer transmit filter 116 and out to the antenna 124. For example, a modulated signal can be upconverted in a transmitter 102 to the final radio frequency for transmission and input into the power amplifier 104. Once amplified, the transmit signal is routed through the diplexer transmit filter 116 to the antenna 124.

The RFE also includes a receive path, wherein a receive signal is received by the antenna 124, travels into the diplexer 112 and is routed through the diplexer receive filter 120 and into the low noise amplifier (LNA) 108. The receive signal can then be routed out of the RFE 100 and into the receiver 110, as can be appreciated. Signals in the appropriate band, as received by the antenna, are routed through the diplexer receive filter 120 to the LNA 108. After the system signal to noise ratio has been set by the LNA, the receive signal is passed on to be downconverted and demodulated in the receiver 110.

Figure 2:
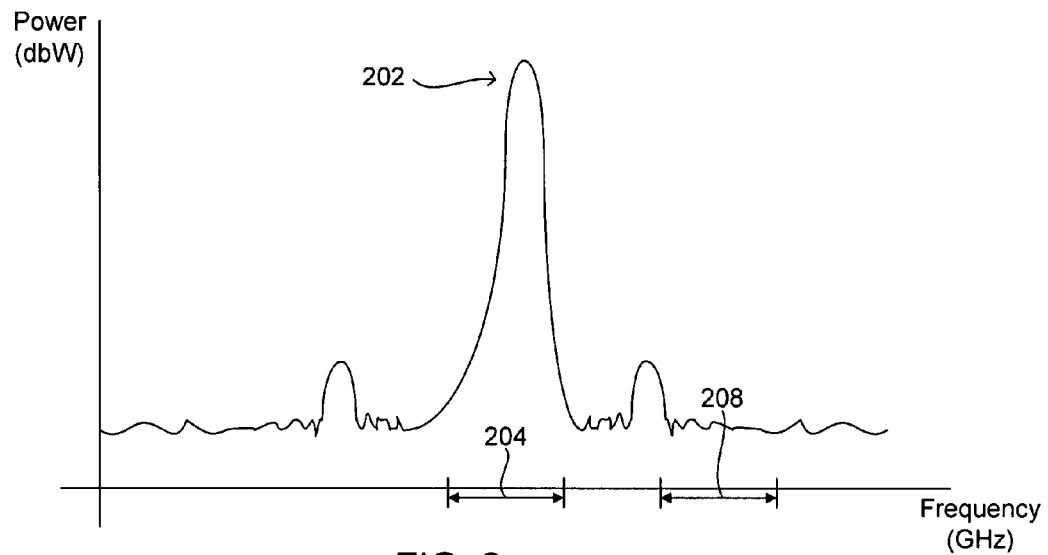
FIG. 2 is a graph depicting a transmit signal spectrum.

Microwave power in two frequency bands emitted from the transmitter power amplifier 104 is of concern to the receiver 110. The two frequency bands of concern are the transmit band and the receive band. An example transmit signal 202 is shown in FIG. 2 in the frequency domain, with an exemplary transmit band 204 and receive band 208 displayed. For illustrative purposes, the transmit band may be a band from 12.2 GHz to 12.5 GHz, comprising 300 MHz of bandwidth. The receive band may be from 12.8 GHz to 13.1 GHz. It is understood that the invention is not limited to these values. The transmit and receive bands may have the same bandwidth or different amounts of bandwidth. The bandwidth of each band can range from several hertz to several gigahertz and can be located throughout the radio spectrum, depending upon design needs.

In the transmit bandwidth exists the main power of the transmitted signal, which can jam the receiver. In the receive bandwidth, power emitted by the power amplifier can cause difficulties for the receiver, effectively raising the noise temperature and lowering the gain over system noise temperature ratio (G/T) of the receiver.

In a traditional or standard RFE isolation analysis, the main power in the transmit band output from the power amplifier 104, as shown in FIG. 1, is typically not allowed to capture any automatic gain control circuits. To accomplish this, it is good design practice to attenuate the transmitted power below the thermal noise power in the bandwidth of the receiver 110, with some margin. A typical margin of 10 to 20 dB is used in practice. As part of this analysis, isolation from Intermediate Frequency (IF) filters or baseband filters may be taken into account. Thus, the equation for determining the necessary diplexer receive filter 120 isolation ($I_{Rx}$), in dB, in the transmit band is given in equation (1), where P is the transmit power from the power amplifier in decibels referenced to a watt (dBW), κ is Boltzmann's constant, $F_{Rx}$ is the receiver noise factor, B is the receiver RF bandwidth in Hz, M is the margin in dB, and $I_{IF}$ is additional isolation provided by filters after the RFE in dB. It should be noted that the noise factor is a ratio with no units.

$$I_{Rx} = P - 10 \log(290\kappa(F_{Rx}-1)B) + M - I_{IF} \quad (1)$$

In (1), ($F_{Rx}-1$) is used, which assumes no noise input from the antenna 124, a worst-case assumption for this isolation analysis. If a large value of filtering outside the RFE ($I_{IF}$) is used, care must be taken to not saturate the LNA 108 as well. Downconverted spurs from the transmit band power should also be considered as part of the transmit band analysis if the power in the transmit band is still significant when it reaches the mixer in the receiver 110.

The second band of concern in which there is energy emitted from the power amplifier 104 is the receive band 208. To achieve a maximum signal to noise ratio, noise and possibly power from the sidelobes of the modulated transmit signal, which exist in the receive band, should be impeded from reaching the receiver 110. The integrated noise power from the transmitter in the receive band must be 16 dB below the thermal noise power in the receive bandwidth in order to keep the degradation of signal to noise ratio below 0.1 dB. Thus, a margin (M) of 16 dB is recommended for diplexer transmit filter 112 isolation analysis. If sufficient intermediate frequency filtering or baseband spectral shaping is used such that the modulated signal in the receive band is below the noise floor after the power amplifier 104, then the integrated noise power output from the power amplifier in the receive band ($N_{Rx}$) in dBW can be calculated using (2).

$$N_{RX} = 10 \log\left(10^{\frac{N_{Tx}+G_{Tx}}{10}} + 290\kappa(F_{Tx}-1)B\left(10^{\frac{G_{Tx}}{10}}\right)\right) \quad (2)$$

$N_{Tx}$ is the total noise power in the receive bandwidth from the transmitter 102 in dBW, $G_{Tx}$ is the power amplifier gain in dB, $F_{Tx}$ is the power amplifier noise factor (unitless), and B is the receive bandwidth in Hz. If the modulated signal in the receive band is not below the noise floor, then $N_{Rx}$ can be calculated by integrating the modulated waveform and noise output from the power amplifier 104 over the receive bandwidth 208. Once $N_{Rx}$ is calculated, the necessary diplexer transmit filter 112 isolation ($I_{Tx}$), in dB, in the receive band can be found using (3).

$$I_{Tx} = N_{Rx} + M - 10 \log(290\kappa(F_{Rx}-1)B) \quad (3)$$

Split Isolation RFE Architecture

Figure 3:
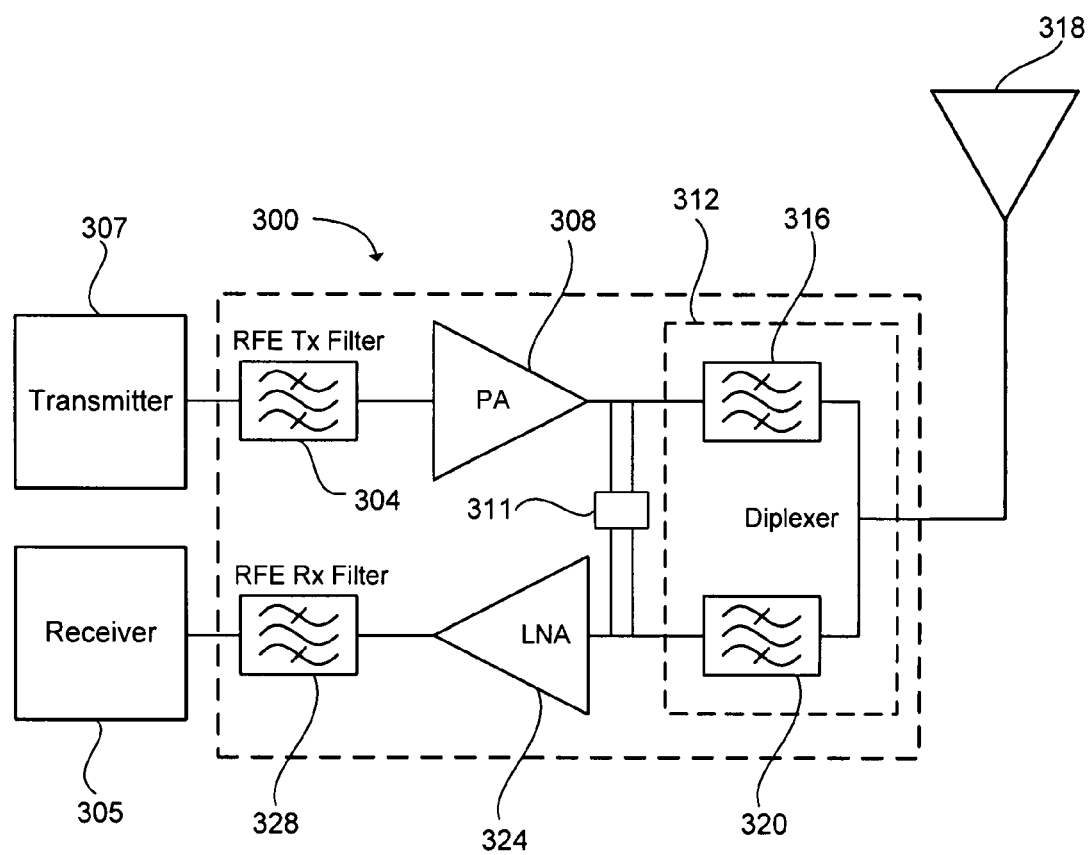
FIG. 3 is a block diagram of a split isolation RFE in accordance with an embodiment of the invention.

A block diagram of one embodiment of a split isolation RFE is shown in FIG. 3. In the split isolation concept, significant amounts of filtering are removed from the diplexer to before the power amplifier 308 and after the LNA 324. This change in design has several distinct advantages. Added flexibility is given to the designer in determining where it is most advantageous to place the filtering. For example, a designer can decide how much filtering to remove from the diplexer transmit filter 316 and move to an RFE transmit filter 304 located on the other side of the power amplifier according to the limitations that will follow. Further, the attenuation from the RFE receive filter can be distributed throughout the receive path. Additionally, the filtering removed from the diplexer can be traded for improved link margin, with fewer sections of filtering of the same type; or for different type filters with the same insertion loss as a traditional transmit diplexer filter 112 but lower rejection, size and weight.

Filtering in the location of the diplexer can be expensive in terms of either the link budget or size and weight. Every dB of insertion loss translates directly to a dB loss in link margin. In contrast, filter insertion loss on the other side of the power amplifier 308 and LNA 324 has virtually no effect on link margin. By reducing the rejection requirements on the diplexer filter, the filter can be implemented with fewer sections, and therefore, have lower insertion loss. The lower insertion loss of the diplexer filter can improve link margin by substantially the same amount.

Alternatively, the reduced rejection requirement can be traded for reduced size and weight. Since insertion loss in the diplexer 312 is so critical, in a traditional RFE architecture, waveguide filters are typically used to minimize the insertion loss. Waveguide diplexers are large, heavy, and expensive. In a typical RFE, the waveguide diplexer can account for approximately half of the size and weight of the RF Electronics. In the split isolation RFE architecture, higher insertion loss filters can be located on the other side of the power amplifier 308 and LNA 324 that are much smaller and lighter than the waveguide diplexers used in a traditional RFE architecture.

By taking a large amount of the rejection requirement out of the diplexer, filter solutions other than waveguide can be considered in the diplexer 312 location. Cavity filters with rejection from 40 to 80 dB can be found with loss comparable to waveguide filters with 110 to 140 dB rejection, yet the cavity filters are about ¼ the size, weight and cost.

Split Isolation RFE Analysis

The same frequency bands are of concern in the isolation analysis of the split isolation RFE 300 as with the traditional RFE 100. For transmit band isolation, the minimum requirement of the receive diplexer filter 320 is to attenuate the power from the transmitter such that it does not distort the LNA 324. Thus, the minimum isolation of the receive diplexer filter ($I_{DRx}$), in dB, at the transmit frequency can be found using (4).

$$I_{DRx} = P - OP_{1dB} + G_{Rx} + M \quad (4)$$

P is the transmitter power in dBW, $OP_{1dB}$ is the output 1 dB compression point of the LNA 324 in dBW, and $G_{Rx}$ is the LNA gain in dB. A margin (M) of 5 to 10 dB is typically used to assure the linearity of the LNA.

Typical values associated with (4) include a transmitter power of 0 dBW to 23 dBW, a 1 dB compression point for the LNA of −20 dBW to −10 dBW, and an LNA gain of 20 to 40 dB. Using these typical numbers, the isolation of the receive diplexer filter at the transmit frequency can vary from 35 dB to 93 dB. It should be noted that values well outside the typical values given within this document are within the scope of the invention.

The isolation of the RFE receive filter 328 located after the LNA ($I_{FRx}$) can be calculated simply using (1), (4) and (5).

$$I_{FRx}=I_{Rx}-I_{DRx} \quad (5)$$

Using the typical values previously listed, and assuming a transmit band isolation level of 100 dB to 140 dB, the RFE receive filter can have typical values from 7 dB to 105 dB.

In order to achieve minimal filtering in the diplexer transmit filter 316, minimal noise must be output from and therefore input to the power amplifier 308 over the receive bandwidth. To achieve minimal noise input to the power amplifier, the RFE transmit filter 304, located before the power amplifier 308, is used to attenuate the noise power in the receive bandwidth from the transmitter 307 below the thermal noise in the transmit path. This will reduce the noise power in the receive bandwidth output from the power amplifier to only thermal noise and noise generated by the power amplifier. Also, to achieve minimal noise output from the power amplifier, only passive elements are usually inserted between the RFE transmit filter and the power amplifier. Active elements can introduce extra noise in the transmit path, and therefore are typically avoided. The isolation typically required by the transmit filter before the power amplifier ($I_{FTx}$), in dB at the receive frequency can be calculated with (6).

$$I_{FTx}=N_{Tx}-10\log(290\kappa F_{Tx}B)+M \quad (6)$$

Example ranges of values used to determine the RFE transmit filter 304 isolation level in the split isolation architecture include a noise power from the transmitter 307 of −150 dBm/Hz to −100 dBm/Hz, and a noise floor value of the power amplifier of −174 dBm/Hz to −160 dBm/Hz. A margin of about 10 to 20 dB is recommended to ensure that the noise power output from the power amplifier 308 is not measurably increased above the thermal noise and noise generated by the power amplifier 308.

With only thermal noise entering the power amplifier 308, the noise output from the power amplifier 308 in the receive bandwidth ($N_{Rx}$) is then $$N_{Rx}=10\log(290\kappa F_{Tx}B)+G_{Tx}. \quad (7)$$

Equation (7) assumes that the power amplifier 308 will not regrow modulated sidelobes from the transmit signal in the receive band above the noise power output by the power amplifier 308. It has been found that, due to slow phase effects from filtering, sidelobes in the receive band typically do not regrow above the noise power output from the power amplifier. This postulate was tested under CDL data rates and modulation types. Even with a low noise figure in the tested power amplifier of approximately 4 dB, and with the power amplifier pushed into saturation, the postulate held true and the sidelobes in the receive band did not regrow above the maximum noise output from the power amplifier.

Inserting (7) into (3) and canceling thermal noise from the power amplifier 308 and low noise amplifier 324 yields the equation for the minimum isolation typically required in the diplexer transmit filter 316 ($I_{DTx}$) at the receive frequency in the split isolation RFE 300 shown in (8).

$$I_{DTx}=10\log(F_{Tx})-10\log(F_{Rx}-1)+G_{Tx}+M \quad (8)$$

Since the noise factor of the LNA 324 is typically small when compared to the noise factor and gain of the power amplifier 308, it can be ignored, giving the elegant equation in (9), where $NF_{Tx}$ is the power amplifier noise figure in dB.

$$I_{DTx}=NF_{Tx}+G_{Tx}+M \quad (9)$$

Typical values of a solid state power amplifier for noise figure can be about 4 dB to 10 dB and a gain of approximately 25 dB to 50 dB. If a traveling wave tube amplifier is used, a gain of about 50 dB to 60 dB can be expected with a similar noise figure to solid state devices. A typical margin is around 10 dB to 20 dB. Thus, for a solid state power amplifier, the diplexer transmit filter 316 at the receive frequency can have a value of around 39 dB to 80 dB. For a traveling wave tube amplifier, the diplexer receive filter can have a value of 64 dB to 90 dB.

The split isolation RFE 300 may provide reduced resistance to jamming outside the receive bandwidth compared to a traditional RFE 100, while vulnerability of the split isolation design to a jammer in the receive bandwidth remains substantially equal to the traditional RFE. Although this reduced resistance should not be ignored, even with a relatively low end diplexer filter rejection of 50 dB, out-of-band jamming signals with up to 1 kW of power received by the antenna can be withstood by the split isolation RFE with no damage. If additional resistance to jammers is needed, a limiter can be added to the split isolation RFE with little impact on the size and weight of the RFE, greatly increasing the jammer level the split isolation RFE can withstand both in-band and out-of-band.

Figure 4:
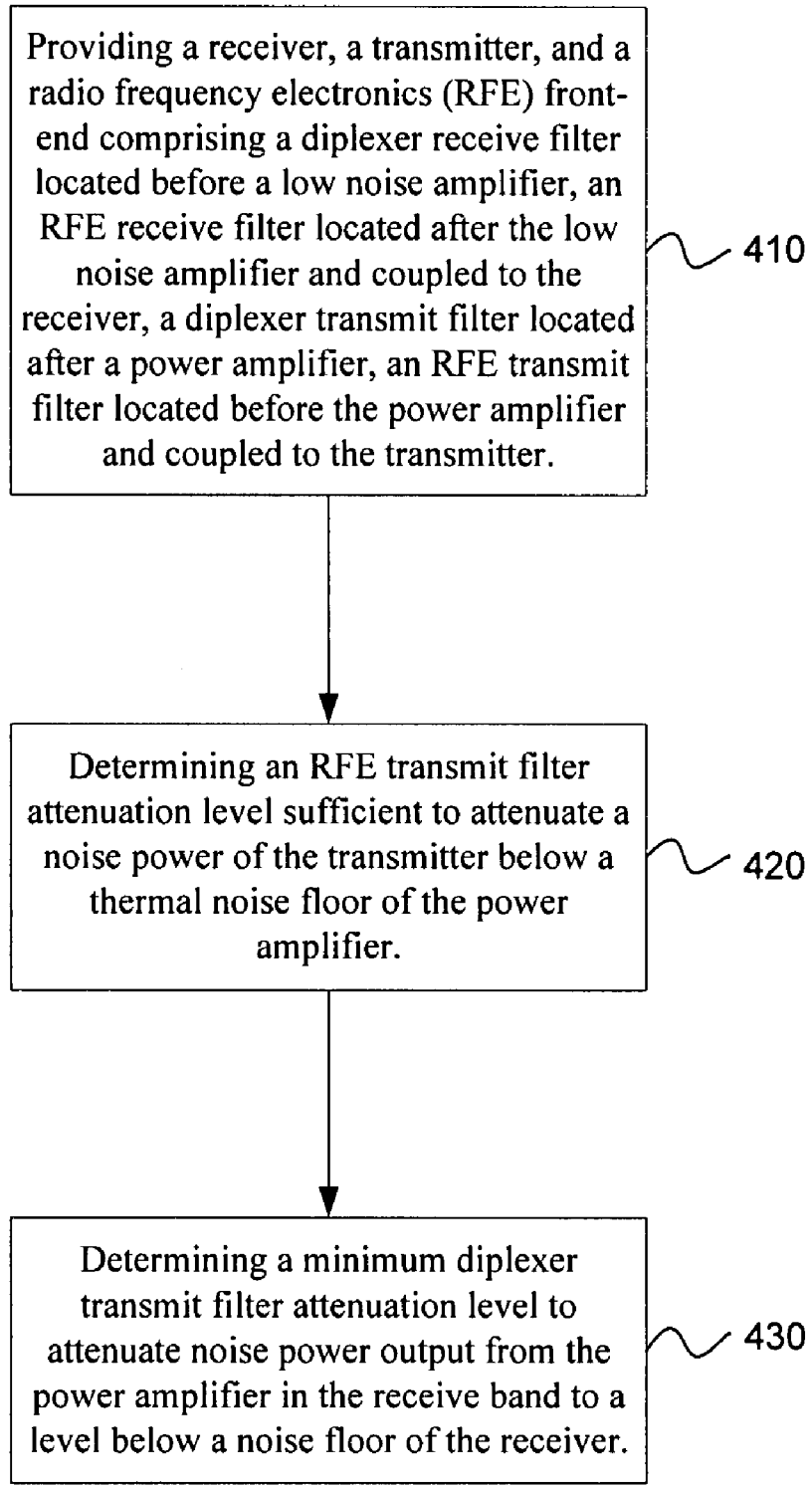
FIG. 4 is a flow chart depicting a method for designing a full duplex communications transceiver to enable a reduction in isolation between a transmit signal and a receive signal at a diplexer in accordance with an embodiment of the present invention.

One embodiment of the present invention provides a method 400 for designing a full duplex communications transceiver to enable a reduction in isolation between a transmit signal and a receive signal at a diplexer, as shown in the flow chart of FIG. 4. The method includes the operation of providing 410 a receiver, a transmitter, and a radio frequency electronics (RFE) front-end comprising a diplexer receive filter located before a low noise amplifier, an RFE receive filter located after the low noise amplifier and coupled to the receiver, a diplexer transmit filter located after a power amplifier, an RFE transmit filter located before the power amplifier and coupled to the transmitter.

The method further includes the operation of determining 420 an RFE transmit filter attenuation level sufficient to attenuate a noise power of the upconverter below a noise floor of the power amplifier. The RFE transmit filter isolation value can be determined using equation (6). The method additionally includes determining 430 a minimum diplexer transmit filter attenuation level to attenuate noise power output from the power amplifier in the receive band to a level below a noise floor of the receiver. The diplexer transmit filter isolation value can be determined using equation (9).

A minimum diplexer receive filter attenuation level can be calculated to attenuate a transmit signal output from the power amplifier to a level below a 1 dB compression point of the low noise amplifier. The minimum diplexer receive filter attenuation level can be determined using equation (4). An RFE receive filter attenuation level can be calculated such that the diplexer receive filter and the RFE receive filter together provide sufficient filtering to attenuate the transmit signal below a thermal noise power of the receiver band. The RFE receive filter can be determined using equation (5) and equation (1).

Applications where the combined gain and noise figure of the power amplifier 308 are relatively low can gain the largest advantage by switching to the split isolation architecture 300, as shown in FIG. 3. For example, solid state power amplifiers have a combined gain and noise figure that are relatively low. Applications using a microwave power module or a traveling wave tube amplifier may not see as much benefit from switching to the split isolation architecture due to a higher noise figure and gain of these amplifiers.

One instance where the split isolation RFE 300 typically has added benefit is in CDL systems that require the ability to flop transmit and receive frequency bands. In a traditional RFE, in order to achieve floppability, four switches are needed to attain the 120 to 140 dB of isolation required from the diplexer. When these large, heavy waveguide switches are included in the diplexer, it greatly increases the cost of the diplexer along with its size and weight. In the split isolation RFE, with the reduced rejection requirements for the diplexer filters, only a single transfer switch 311 may be required to flop bands, saving size, weight and cost.

The use of a split isolation architecture 300 can also be a recurring cost cutting measure. For example, a typical simple CDL diplexer can cost from $5000 to $25000, depending on requirements. In contrast, typical cavity filters which can be used in the split isolation architecture cost in the neighborhood of $200 to $800.

Another area of promising applications for the split isolation RFE are those that require very low size and weight. CDL or CDL type links recently have expanded to unmanned aerial reconnaissance vehicles and portable applications such as Rover III. These applications can be extremely sensitive to size, weight and power requirements. By freeing the RFE designer from the necessity of a waveguide diplexer, the split isolation RFE makes possible the design of very small and light RFEs. A full duplex, medium power (~15 W), CDL capable split isolation RFE on a single circuit card assembly under 2 pounds and 25 cubic inches is within the realm of possibility opened up by this new architecture. In contrast, a small, lightweight CDL RFE using the standard architecture is around 5 pounds and 100 cubic inches. Typical RFEs are around 25 pounds and 2400 cubic inches. Transitioning to the split isolation architecture can provide a remarkable decrease in size and weight. This decrease in size and weight enabled by the split isolation architecture opens up the possibility of common data links for a variety of size, weight, and power constrained platforms and applications.

The units in the equations disclosed above are specified in ratio values of decibels and decibels relative to watts. It can be appreciated that any equivalent type of ratio value can also be used, such as decibels relative to milliwatts or other equivalents.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A method for designing a full duplex communications transceiver to enable a reduction in isolation between a transmit signal and a receive signal at a diplexer, comprising:
providing a receiver, a transmitter, and a radio frequency electronics (RFE) front-end comprising a diplexer receive filter located before a low noise amplifier, an RFE receive filter located after the low noise amplifier and coupled to the receiver, a diplexer transmit filter located after a power amplifier, an RFE transmit filter located before the power amplifier and coupled to the transmitter;
determining an RFE transmit filter attenuation level sufficient to attenuate a noise power of the transmitter below a thermal noise floor of the power amplifier;
determining a minimum diplexer transmit filter attenuation level to attenuate noise power output from the power amplifier in a receive band to a level below a noise floor of the receiver
configuring the RFE transmit filter to provide at least the RFE transmit filter attenuation level; and
configuring the diplexer transmit filter to provide at least the minimum diplexer transmit filter attenuation level.

2. A method as in claim 1, further comprising:
determining a minimum diplexer receive filter attenuation level to attenuate a transmit signal output from the power amplifier to a level below a 1 dB compression point of the low noise amplifier; and
configuring the diplexer receive filter to provide at least the minimum diplexer receive filter attenuation level.

3. A method as in claim 2, further comprising calculating an RFE receive filter attenuation level such that the diplexer receive filter and the RFE receive filter together provide sufficient filtering to attenuate the transmit signal below a thermal noise power of the receive band.

4. A method as in claim 3, wherein determining the minimum diplexer receive filter attenuation level further comprises determining the minimum diplexer receive filter attenuation level according to the equation:

$$I_{DRx} = P - OP_{1dB} + G_{Rx} + M$$

where $I_{DRx}$ is the attenuation level of the diplexer receive filter in dB, P is a power level of the transmitter, $OP_{1dB}$ is the 1 dB compression point of the low noise amplifier, $G_{Rx}$ is a gain of the low noise amplifier, and M is a margin having a predetermined value.

5. A method as in claim 4, wherein the predetermined value for the margin M is selected to provide a substantially linear output from the low noise amplifier.

6. A method as in claim 4, further comprising calculating the RFE receive filter attenuation level according to the equation $$I_{FRx} = I_{Rx} - I_{DRx}$$

where $I_{FRx}$ is the attenuation level of the RFE receive filter in dB and $I_{Rx}$ is a transmit band isolation in dB.

7. A method as in claim 6, wherein calculating the transmit band isolation $I_{Rx}$ further comprises calculating the transmit band isolation according to the equation:

$$I_{Rx} = P - 10 \log(290 \kappa (F_{Rx} - 1) B) + M - I_{IF}$$

where P is a transmit power from the power amplifier in decibels referenced to a watt (dBW), κ is Boltzmann's constant, $F_{Rx}$ is a receiver noise factor, B is a receiver RF bandwidth in Hz, M is a margin in dB, and $I_{IF}$ is additional isolation provided by filters after the RFE in dB.

8. A method as in claim 1, wherein determining the RFE transmit filter attenuation level further comprises calculating the RFE transmit filter attenuation level according to the equation:

$$I_{FTx} = N_{Tx} - 10 \log(290 \kappa F_{Tx} B) + M$$

where $I_{FTx}$ is the RFE transmit filter attenuation level in dB, $N_{Tx}$ is a total noise power in a receive bandwidth from the transmitter, $10 \log(290 k F_{Tx} B)$ is a noise floor of the power amplifier where k is Boltzman's constant, FTx is a power amplifier noise factor, B is a receive bandwidth in Hz, and M is a margin having a predetermined value.

9. A method as in claim 8, wherein M is selected such that a degradation of a signal to noise ratio of the receive band is less than a predetermined amount.

10. A method as in claim 1, wherein determining the minimum diplexer transmit filter attenuation level further comprises determining the minimum diplexer transmit filter attenuation level according to the equation:

$$I_{DTx} = NF_{Tx} + G_{Tx} + M$$

where $I_{DTx}$ is the minimum diplexer transmit filter attenuation level in dB, $NF_{Tx}$ is a power amplifier noise figure, $G_{Tx}$ is a gain of the power amplifier, and M is a margin having a predetermined value.

11. A method as in claim 10, wherein M is selected such that a degradation of a signal to noise ratio of the receive band is less than a predetermined amount.

12. A method as in claim 2, wherein determining the minimum diplexer receive filter attenuation level and the minimum diplexer transmit filter attenuation level enables a split isolation RFE having a reduced size and weight relative to a standard RFE.

13. A method as in claim 2, wherein determining the minimum diplexer receive filter attenuation level and the minimum diplexer transmit filter attenuation level enables a split isolation RFE having an improved link margin relative to a standard RFE.

14. A system for reducing isolation between a transmit signal and a receive signal at a diplexer, comprising:
    a receiver;
    a transmitter;
    a radio frequency electronics (RFE) front-end comprising a diplexer receive filter located before a low noise amplifier, an RFE receive filter located after the low noise amplifier and coupled to the receiver, a diplexer transmit filter located after a power amplifier, an RFE transmit filter located before the power amplifier and coupled to the transmitter;
    wherein the diplexer transmit filter provides sufficient filtering to attenuate noise power output from the power amplifier in a receive band to a level below a noise floor of the receiver; and
    wherein the RFE transmit filter provides sufficient filtering to attenuate a noise power of the transmitter below a thermal noise floor of the power amplifier.

15. A system as in claim 14, wherein the diplexer receive filter provides sufficient filtering to attenuate a transmit signal output from the power amplifier to a level below a 1 dB compression point of the low noise amplifier.

16. A system as in claim 15, wherein the diplexer receive filter and the RFE receive filter together provide sufficient filtering to attenuate the transmit signal below a thermal noise power in a receiver band.

17. A system as in claim 14, wherein the diplexer receive filter and the diplexer transmit filter are cavity filters.

18. A system as in claim 14, wherein a reduced filtering level in the diplexer receive filter and the diplexer transmit filter enables a split isolation RFE having a reduced size and weight relative to a standard RFE.

19. A system as in claim 18, wherein the split isolation RFE is a full duplex command data link capable split isolation RFE assembly weighing less than 2 pounds.

20. A system as in claim 18, wherein the split isolation RFE has a volume of less than 25 cubic inches.

21. A system as in claim 18, wherein the split isolation RFE is located on a single circuit card.

22. A system as in claim 14, wherein a reduced filtering level in the diplexer receive filter and the diplexer transmit filter enables a split isolation RFE having an improved link margin relative to a standard RFE.

23. A system as in claim 14, further comprising a transfer switch located external to and coupled with the radio frequency electronics front-end to flop the transmit band and the receive band.

24. A method for designing a full duplex communications transceiver to enable a reduction in isolation between a transmit signal and a receive signal at a diplexer, comprising:
    providing a receiver, a transmitter, and a radio frequency electronics (RFE) front-end comprising a diplexer receive filter located before a low noise amplifier, an RFE receive filter located after the low noise amplifier and coupled to the receiver, a diplexer transmit filter located after a power amplifier, an RFE transmit filter located before the power amplifier and coupled to the transmitter;
    determining a minimum diplexer receive filter attenuation level to attenuate a transmit signal output from the power amplifier to a level below a 1 dB compression point of the low noise amplifier;
    configuring the diplexer receive filter to provide at least the minimum diplexer receive filter attenuation level;
    calculating an RFE receive filter attenuation level such that the diplexer receive filter and the RFE receive filter together provide sufficient filtering to attenuate the transmit signal below a thermal noise power of a receive band;
    configuring the RFE receive filter to provide at least the RFE receive filter attenuation level;
    determining an RFE transmit filter attenuation level sufficient to attenuate a noise power of the transmitter below a thermal noise floor of the power amplifier;
    configuring the RFE transmit filter to provide at least the RFE transmit filter attenuation level;
    determining a minimum diplexer transmit filter attenuation level to attenuate noise power output from the power amplifier in the receive band to a level below a noise floor of the receiver;
    configuring the diplexer transmit filter to provide at least the minimum diplexer transmit filter attenuation level.

* * * * *